US008600697B2

(12) United States Patent
Therein et al.

(10) Patent No.: US 8,600,697 B2
(45) Date of Patent: Dec. 3, 2013

(54) EXTENDED THERMAL MANAGEMENT

(75) Inventors: Guy M. Therein, Beaverton, OR (US); Robert T. Jackson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/418,057

(22) Filed: Mar. 12, 2012

(65) Prior Publication Data

US 2012/0173037 A1 Jul. 5, 2012

Related U.S. Application Data

(63) Continuation of application No. 12/316,416, filed on Dec. 12, 2008, now Pat. No. 8,135,559, which is a continuation of application No. 10/879,922, filed on Jun. 28, 2004, now Pat. No. 7,467,059.

(51) Int. Cl.
*G01K 13/00* (2006.01)

(52) U.S. Cl.
USPC ........... 702/130; 702/131; 702/132; 374/141; 374/166; 374/167; 374/170; 374/171; 327/512; 327/513; 713/320; 713/322; 713/323

(58) Field of Classification Search
USPC .......... 702/130, 131, 132; 374/141, 166, 167, 374/170, 171; 327/512, 513; 713/320, 322, 713/323
See application file for complete search history.

(56) References Cited

U.S. PATENT DOCUMENTS

| 5,424,767 | A | 6/1995 | Alavizadeh et al. |
| 5,675,297 | A | 10/1997 | Gose et al. |
| 6,908,227 | B2 | 6/2005 | Rusu et al. |
| 7,467,059 | B2 * | 12/2008 | Therien et al. ................ 702/130 |
| 8,135,559 | B2 * | 3/2012 | Therien et al. ................ 702/130 |
| 2003/0109967 | A1 | 6/2003 | Cooper |

FOREIGN PATENT DOCUMENTS

| WO | 2006/011992 A2 | 2/2006 |
| WO | 2006/011992 A3 | 3/2006 |

OTHER PUBLICATIONS

Office Action Received for Chinese Patent Application No. 200580017030.2, mailed on Sep. 14, 2007, 9 pages of Office Action and 8 pages of English Translation.
Office Action Received for Taiwan Patent Application No. 94120292, mailed on Nov. 1, 2006, 8 pages of English Translation only.
Office Action Received for European Patent Application No. 05757334.7, mailed on Mar. 25, 2011, 5 pages.

* cited by examiner

*Primary Examiner* — Sujoy Kundu
(74) *Attorney, Agent, or Firm* — Derek J. Reynolds

(57) ABSTRACT

A method for managing thermal condition of a thermal zone that includes multiple thermally controllable components include determining thermal relationship between the components and reducing temperature of a first component by reducing thermal dissipation of a second component.

24 Claims, 7 Drawing Sheets

EXTENDED THERMAL MANAGEMENT

CROSS REFERENCE TO RELATED APPLICATION

This application claims priority to and is a Continuation Application of U.S. patent application Ser. No. 12/316,416 filed on Dec. 12, 2008 and is now granted U.S. Pat. No. 8,135,559, which is a Continuation Application of U.S. patent application Ser. No. 10/879,922 filed on Jun. 28, 2004 and is now granted U.S. Pat. No. 7,467,059; both of which are entirely incorporated by reference.

FIELD OF INVENTION

The present invention generally relates to the field of thermal management. More particularly, an embodiment of the present invention relates to thermal management based on thermal relationship among components in a system.

BACKGROUND

Platform performance goals continue to drive multiple high-power components typically found in the platforms of desktop computer systems into the platforms of mobile computer systems. Leveraging the same components into the platforms of both desktop and mobile computer systems has certain advantages. However, the difference in thermal dissipation capability between the platforms of the desktop computer systems and of the mobile computer systems has resulted in implementations that may limit the performance of certain high-power, high-performance components when these components are implemented in the platforms of mobile computer systems.

BRIEF DESCRIPTION OF THE DRAWINGS

The invention may be best understood by referring to the following description and accompanying drawings that are used to illustrate embodiments of the invention. In the drawings.

DESCRIPTION

For one embodiment, a method and system for thermal management in a computer system is disclosed. There may be multiple thermal zones, with each zone having two or more thermally controllable components. Thermal relationships between the thermally controllable components in a thermal zone may be used to improve the thermal management of the thermal zone.

In the following detailed description of embodiments of the present invention numerous specific details are set forth in order to provide a thorough understanding of the present invention. However, it will be apparent to one skilled in the art that embodiments of the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "for one embodiment" in various places in the specification are not necessarily all referring to the same embodiment.

Legacy Thermal Zone

Figure 1:
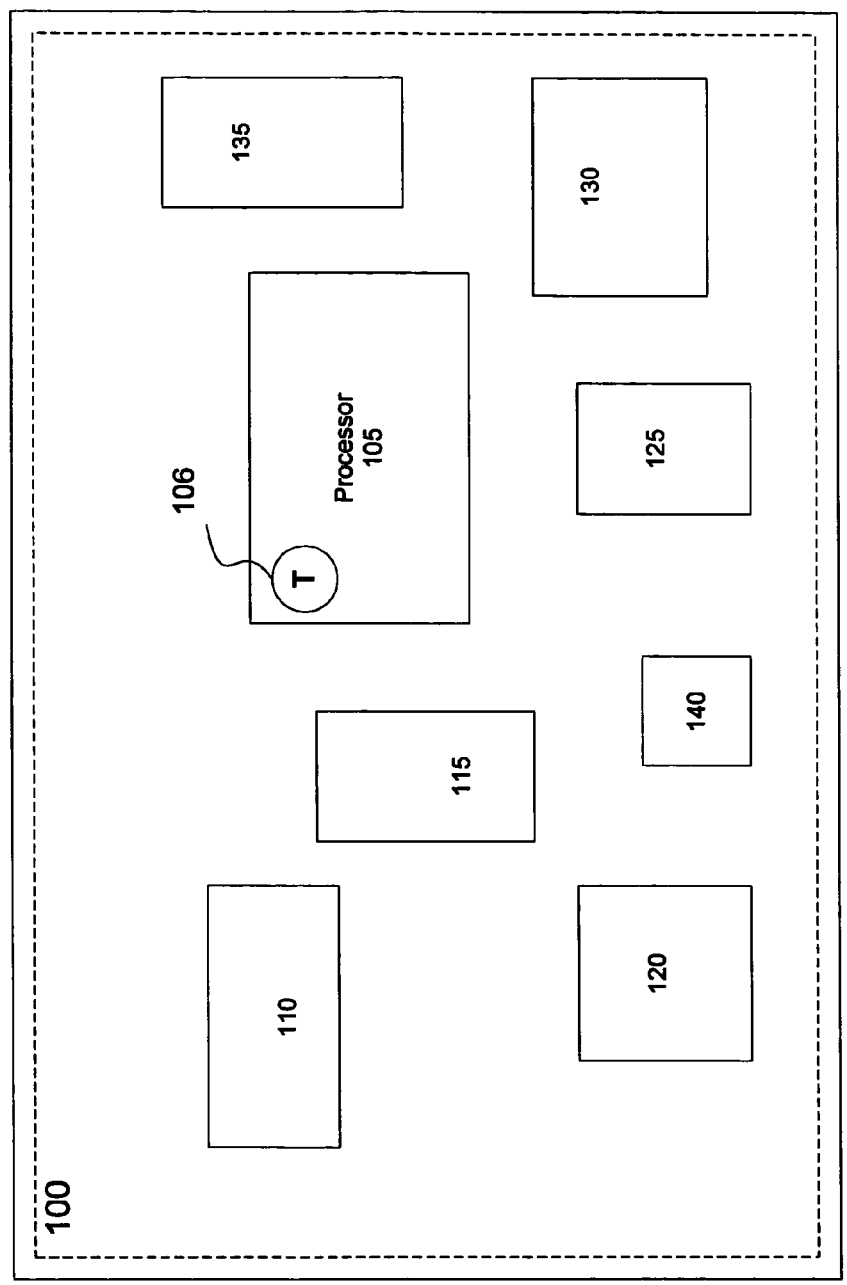
FIG. 1 is a diagram illustrating an example of a prior art system with a single thermal zone.

FIG. 1 is a diagram illustrating an example of a prior art system with a single thermal zone. Generally, a thermal zone is defined as a platform entity and may be referred to herein as a legacy thermal zone. Referring to FIG. 1, the legacy thermal zone 100 (illustrated within the dotted lines) may include a processor 105. Typically, throttling and performance state controls are described for the processor 105. The legacy thermal zone 100 may also include other components 110-140. The processor 105 may include an embedded thermal sensor 106. The thermal sensor 106 may be used to monitor the thermal condition of the processor 105 and of the legacy thermal zone 100. Among all of the components 105-140 within the legacy thermal zone 100, the processor 105 may be the only component that includes the embedded thermal sensor 106. There is not much comprehension of temperature or thermal controls of the components 110-140. The implication is that by controlling performance state of the processor 105, the temperature or thermal condition of the legacy thermal zone 100 may be controlled.

Multiple Thermal Zones

Figure 2:
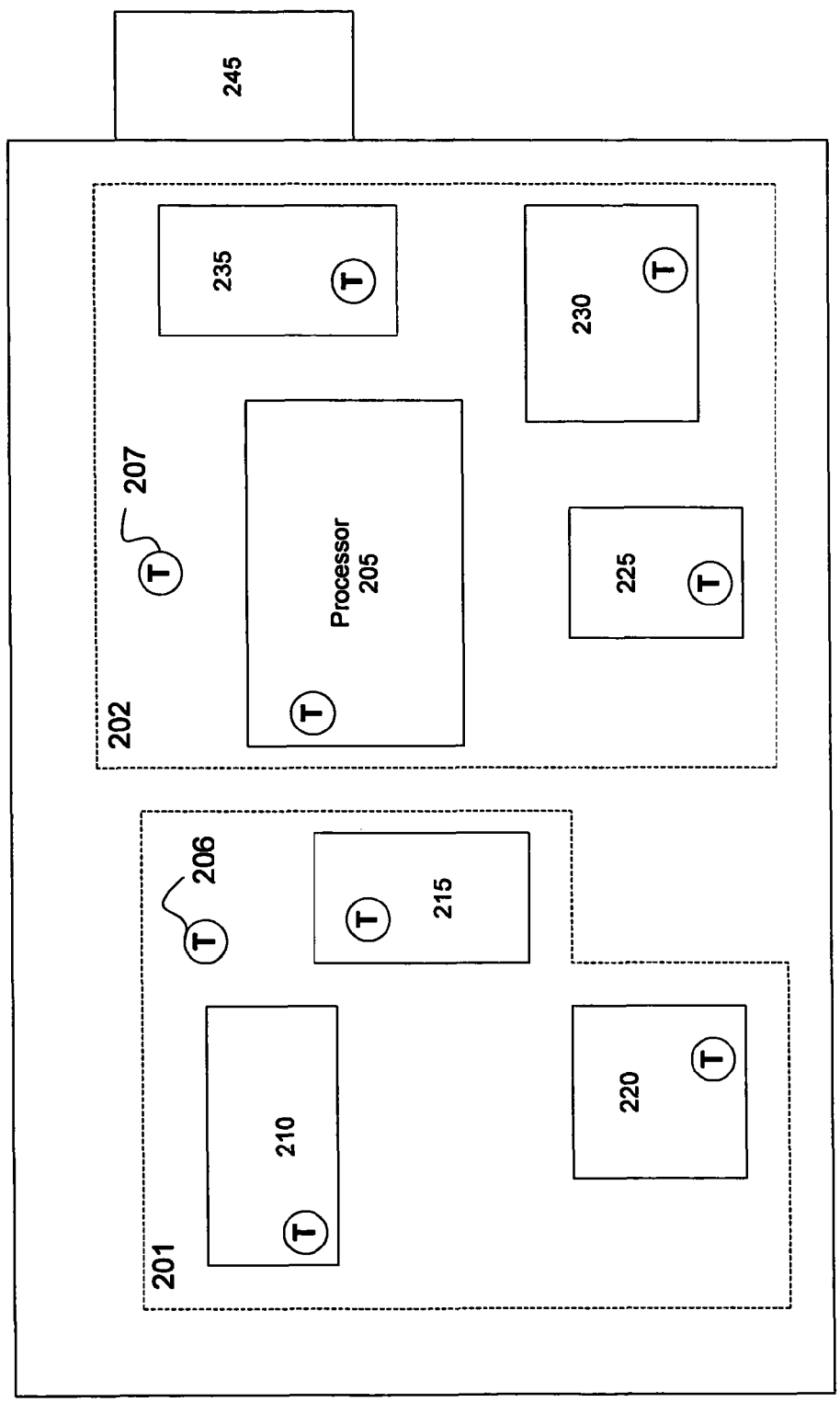
FIG. 2 is a diagram illustrating an example of a system that includes multiple thermal zones, in accordance with one embodiment.

FIG. 2 is a diagram illustrating an example of a system that includes multiple thermal zones, in accordance with one embodiment. The components in a system may be grouped into two or more thermal zones such as, for example, thermal zones 201, 202 illustrated in FIG. 2 within the dotted lines.

For one embodiment, each of the thermal zones 201, 202 may have its own thermal sensor 206 or 207, respectively. For another embodiment, each of the thermal zones 201, 202 may have its own active cooling device (e.g., a fan) (not shown). An active cooling device 245 may be used to cool to the components 205, 210, . . . , 235 in the thermal zones 201, 202 when there is no thermal zone specific active cooling device. It may be possible that a component in a thermal zone is coupled to a dedicated active cooling device (not shown).

Thermally Controllable Component

For one embodiment, a thermal zone may include two or more components that are thermally controllable. A thermally controllable component may be able to provide information about its thermal condition. For one embodiment, a thermally controllable component is a component that is associated with a thermal sensor. The thermal sensor may be an embedded thermal sensor. The component may include a thermal interface to export or provide information about its thermal constraints, its thermal condition, etc.

The thermal condition may include current temperature (e.g., 78 degrees Celsius). The thermal condition may also include current thermal load (CTL) (e.g., 4 Watts). Being thermally controllable may also include the component having the ability to provide information about its thermal constraints. The thermal constraints may include trip point value(s), information about possible performance state(s) (P states) and/or possible throttle state(s) (T states), etc. The thermal constraints may include load information when the component is idle and its maximum load information so that given a current load, the effect of a control (e.g., P state or linear throttle) may be inferred.

A trip point value may be a temperature value that when the current temperature of the thermally controllable component crosses or violates, a signal is generated by the component. A thermally controllable component may have one or more trip point values. The trip point values may be preset and may be dynamically modified by software. Each trip point value may be associated with a different temperature (e.g., hot, critical, catastrophic, or intermediate etc.) and, when crossed, may necessitate different types of cooling operations to be performed.

The P states and the T states of a thermally controllable component may correspond to different operating states that the component may operate in. The P states may provide more favorable power versus performance tradeoff (e.g., reducing performance by 20% may reduce average power by approximately 40%). The T states may provide a near linear power versus performance tradeoff (e.g., reducing performance by 50% may reduce average power by approximately 50%). The concepts of P states and T states are known to one skilled in the art.

Figure 3:
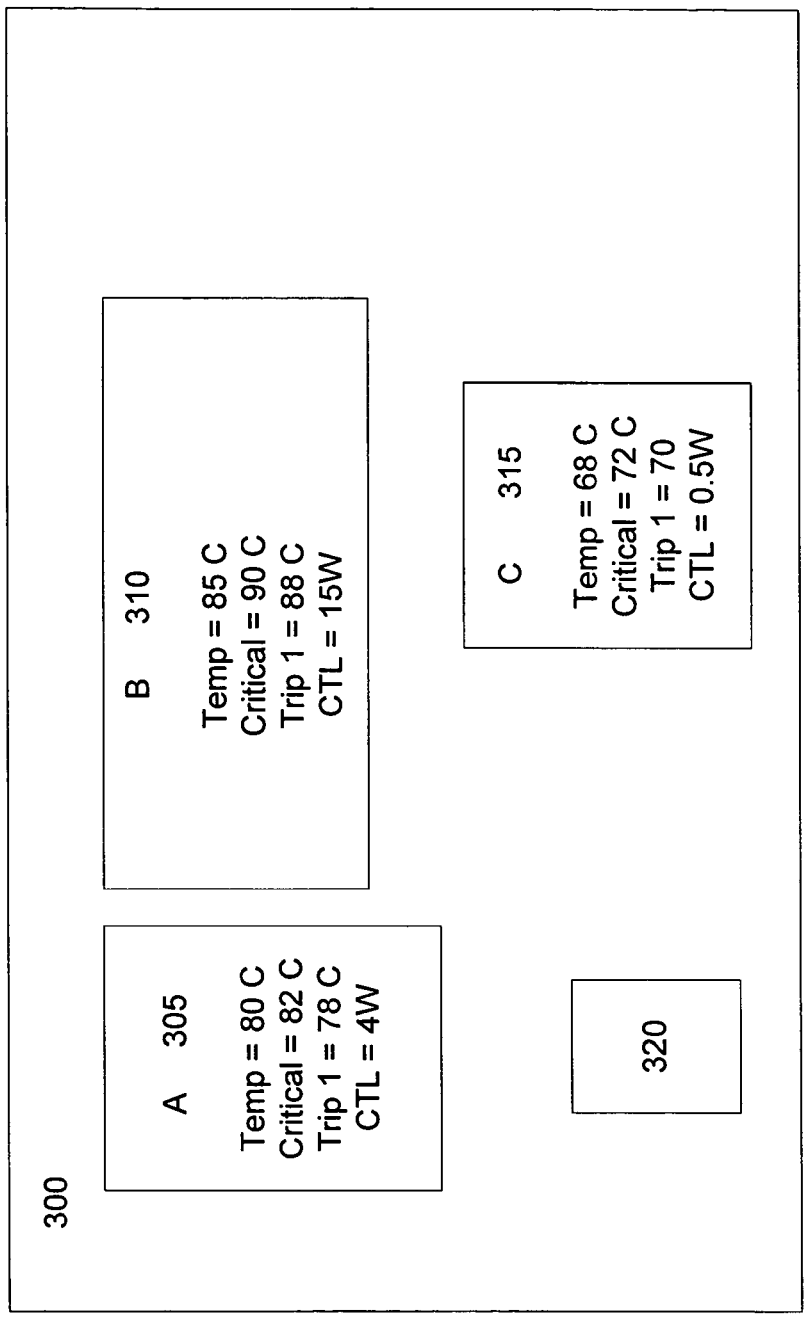
FIG. 3 is a block diagram illustrating an example of information provided by a thermally controllable component, in accordance with one embodiment.

FIG. 3 is a block diagram illustrating an example of information provided by a thermally controllable component, in accordance with one embodiment. Referring to the example in FIG. 3, the information provided by the component A (305) in the thermal zone 300 may include its current temperature at 80 degrees Celsius, its critical temperature at 82 degrees Celsius, its first trip point value at 78 degrees Celsius, and its CTL at 4 Watts. The information provided by the component B (310) and C (315) are also illustrated in the example.

Non-Controllable Component

A thermal zone according to one embodiment may include at least two thermally controllable components and zero or more non-controllable component. A non-controllable component is one that may not be associated with a thermal sensor even though it may have some thermal dissipation. The non-controllable component may not have a thermal interface to provide information about its thermal condition. The non-controllable component may not be capable of operating in different P states or T states. Referring to the example in FIG. 3, component 320 is illustrated as a non-controllable component. It may be noted that the temperature of a non-controllable component may be influenced by the temperature of nearby hot components. Similarly, the cooling of a hot controllable component may indirectly help cool a nearby non-controllable component. It may be possible to have components that have temperature sensors but have no P-state or T-state controls, and these components may also be adversely influenced by the hot temperature of nearby components.

Significant and Non-Significant Thermal Producing Component

Each thermally controllable component in a thermal zone may have a different amount of thermal load or burden. For example, referring to FIG. 3, the CTL of the component B (310) is at 15 Watts, while the CTL of the component A (305) is at only 4 Watts. In this example, the component A (305) is located close to the component B (310), and therefore the thermal condition of the component A (305) may be significantly impacted or influenced by the thermal condition of the component B (310). The thermal condition of the component B (310) may also influence the thermal condition of the component C (315) and the non-controllable component 320.

When the current temperature of the component A (305) crosses its first trip point value at 78 degrees Celsius, the temperature of the component A (305) may be reduced by changing its P state and/or the T state. For one embodiment, the temperature of a component (e.g., component A (305)) may also be reduced by reducing the thermal impact or influence caused by another component (e.g., component B (310)).

Thermally Sensitive Component

Within a thermal zone, there may be a component that is more thermally sensitive than others. This component may not have a high thermal load and may have little thermal dissipation. For example, the component C (315) has a CTL of 0.5 Watt. The component C (315) may be a wireless local area network (WLAN) module and may be thermally sensitive. As such, it may not be sufficient to control the thermal condition of the thermally sensitive component C (315) by relying solely on its P states and/or T states. For one embodiment, to control the thermal condition of the thermally sensitive component it may be necessary to reduce the thermal impact or influence caused by another thermally controllable component that has higher thermal load (e.g., the component B (310)). It may be noted that a component with a very small thermal load may be less likely to be thermally controlled except when the component itself is in an over-temperature condition. This is because the small thermal load component may not materially affect the thermal condition of another component in the same thermal zone. Similarly, a component with a high thermal load may be more likely to be thermally controlled to help cool other components in the same thermal zone.

Thermal Relationship Table (TRT)

The CTL of a component may contribute to the thermal condition of another component and to the thermal condition of a thermal zone. For one embodiment, a TRT is established to describe thermal relationships between the components within a particular thermal zone. As such, a thermal zone may include, for example, a processor, storage, memory, and a TRT as data input, along with the component interfaces for temperature and trip point values.

Figure 4:
FIG. 4 illustrates one example of a TRT, in accordance with one embodiment.

FIG. 4 illustrates one example of a TRT, in accordance with one embodiment. The TRT 400 in this example may be used to describe the various thermal relationship between the components A (305), B (310) and C (315) in the thermal zone 300, as illustrated in FIG. 3. The TRT 400 may be illustrated as a matrix of nine entries (3×3) to accommodate the three components. Each entry may represent the thermal influence that one component has on another component. For example, entry 425 represents the thermal influence that the component A has on the component B.

The thermal influence of one component over another component may not necessarily be symmetrical. For example, the entry 425 (A's thermal influence over B) and the entry 435 (B's thermal influence over A) may not be the same. In addition, it may be possible that the thermal load of one component may overwhelm the thermal load of another component in a thermal relationship. The TRT 400 may also describe how much to change one component in order for that change to have an effect on another component, how long it takes for a change in one component to affect another component (change delay time), etc.

It may be possible that a thermally controllable component may be relocated from one location on a platform to another location on the platform. This change in location may affect the thermal relationship between the components. This change may occur within one thermal zone or it may affect two thermal zones (the old thermal zone and the new thermal zone). For one embodiment, the TRT 400 may be dynamically updatable in order to reflect changes in the thermal relationship between the components. For example, airflow in a thermal zone may change when a fan is activated. This may cause a change in the thermal relationships. For one embodiment, in the presence of a static control policy (i.e., one that does not understand bias/budget), the TRT may be updated to influence that status policy.

User Preference Settings

For one embodiment, user preference settings may be taken into consideration when controlling the thermal condition of a thermal zone. A user interface may be available to specify the user preference settings. The user preference settings may be directed toward high performance or long battery life. A high performance setting may correspond to high thermal dissipation. A long battery life setting may correspond to low thermal dissipation and low performance. In general, passive cooling may include reducing performance to cool, while active cooling may include using power to cool or reducing power while not reducing performance to cool. For one embodiment, when the user preference settings are directed toward performance, active cooling techniques may be applied before passive cooling techniques. For another embodiment, when the user preference settings are directed toward low thermal dissipation or energy conservation (e.g., long battery life), the passive cooling techniques may be applied before the active cooling techniques.

For one embodiment, the user preference settings may not only be towards performance or energy conservation but may also be bias to a specific preference or experience from the user(s) themselves. For example, a user may have a specific preference for gaming experience which may mean that the processor and the graphics controller components getting more budget or resource allocation than perhaps a networking component.

Policy Manager

A policy manager may use the TRT to control the thermal condition of a thermally controllable component or of a thermal zone. Depending on the implementation, there may be a single policy manager, or there may be multiple instantiation of policy mangers, as long as each thermal zone is associated with a thermal manager to receive signals from the component interfaces and make decisions. The policy manager may also take user preference or operating system (OS) requirements as inputs. There may be minimal performance goals that the OS wants to provide. There may also be applications running that have minimum performance goals. As such, these potentially conflicting goals need to be reconciled by the policy manager to decide what to do using a prioritization scheme. Another input that the policy manager may consider is information relating to power used collectively by many systems that may exceed a facility or rack limit, and the policy manager may use this information as the highest priority input.

When the current temperature of a thermally controllable component crosses a trip point value, an over-temperature signal may be generated by the component and sent to the policy manager. The policy manager may query each of the thermally controllable components in the thermal zone to find out their thermal conditions. This may be performed using the thermal interface provided by the component. The policy manager may then use the TRT to determine which component in the thermal zone has the highest thermal influence on the over-temperature component. The policy manager may then apply appropriate active or passive cooling operations.

The policy manager may need to comprehend the user preference settings to apply the appropriate active or passive operations. For one embodiment, when the user preference setting is directed toward performance, the policy manager may first activate a dedicated active cooling device of the over-temperature component if one is available. When one is not available or when that is not sufficient to cool the over-temperature component, the policy manager may then activate the zone-specific active cooling device if one is available. When that is still not sufficient or when the zone-specific active cooling device is not available, the policy manager may activate the platform active cooling device to cool the over-temperature component. When that is still not sufficient, the policy manager may then start changing the P state and/or T state of the over-temperature component.

For one embodiment, when applying the passive cooling operations, the policy manager may limit the component or components with the highest thermal influence to the over-temperature component to achieve the desired thermal condition. For example, the policy manager may not direct a thermally controllable component to a specific state but rather may limit the top-end state(s) available to the component. The top-end state(s) may be higher performance states but may also have higher thermal dissipation. For example, given a component with five P states, the policy manager may limit the component to only the bottom three P states in order to bring down its thermal dissipation.

The policy manager may periodically query the over-temperature component to insure that any thermal control operations performed are effective. The policy manager may use the TRT to find out information about how long it takes for a change in one component to affect the thermal condition of the over-temperature component and uses that information to determine when to do a next query of the over-temperature component.

For one embodiment, when the policy manager determines that the thermal condition of the over-temperature component is still unacceptable (e.g., at or above a trip point), the policy manger may again query each of the thermally controllable components in the thermal zone to find out their thermal conditions and to determine a next component in the thermal zone that has the highest thermal influence on the over-temperature component. It may be possible that this next component may be the same component that the policy manager dealt with after the previous query.

For one embodiment, the policy manager may need to keep track of which components in the thermal zone that have been limited (e.g., limit high performance states) in order to remove the constraints as soon as possible once the thermal condition of the over-temperature component has been abated. As mentioned above, it may be possible that there are some components in a thermal zone that are not thermally controllable and thus not capable of participating in the TRT or being configured by the policy manager. These components may rely on the thermal management of the nearby components to help control their thermal condition.

For one embodiment, the policy manager may also receive an over-temperature signal when the thermal condition of a thermal zone exceeds a zone trip point. Upon receiving the signal, the policy manager may read the current temperature and trip points of all of the components in the thermal zone. When the temperature of a component is above a trip point then P state and/or T state controls or active cooling controls may be applied to the component or to another component in the thermal zone that is causing the over-temperature condition.

It may be possible that after successive cooling operations, the thermal condition of an over-temperature component or of an over-temperature thermal zone cannot be alleviated. For one embodiment, when it is not possible to correct a thermal condition, the policy manager may shut down those components that are not critical to system operation. Alternatively the policy manager may shut down the entire system.

Process

Figure 5:
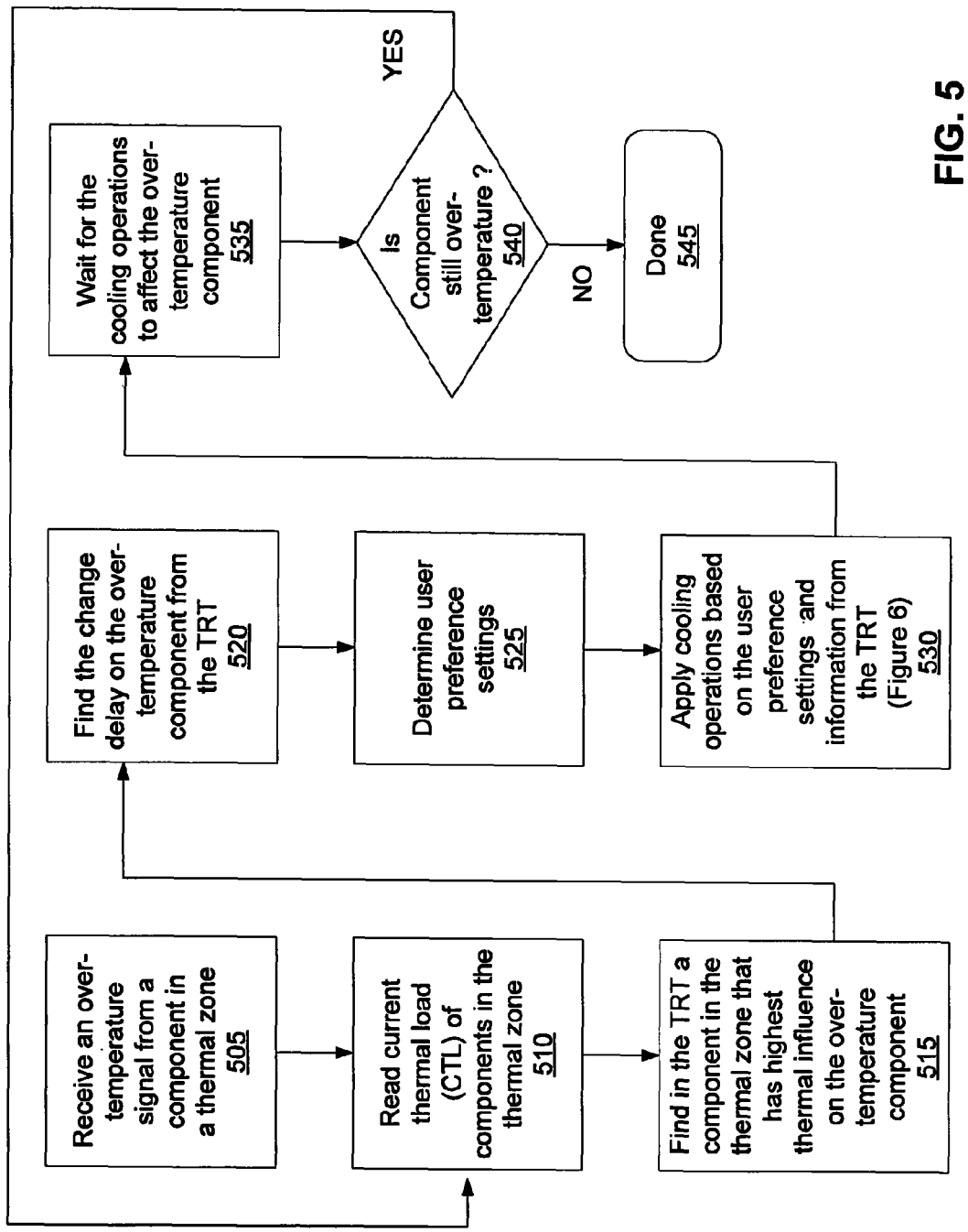
FIG. 5 is a flow diagram illustrating an example of a process that is performed by a policy manager when an over-temperature signal is received, in accordance with one embodiment.

FIG. 5 is a flow diagram illustrating an example of a process that is performed by a policy manager when an over-temperature signal is received, in accordance with one embodiment. Although the over-temperature signal may be received from an over-temperature component or from an over-temperature thermal zone, this example is based on the over-temperature component. At block 505, the over-temperature signal is received by the policy manager. At block 510, the policy manager may read the current thermal load of the thermally controllable components in the thermal zone. This may be done using the thermal interface. At block 515, the policy manager may use the TRT to find a component that has a highest thermal influence on the over-temperature component. At block 520, the change delay is read from the TRT. This change delay is the time it takes for a change to the thermal condition of one component to take effect on the over-temperature component.

At block 525, the user preference setting is determined. At block 530, appropriate cooling operations are applied based on the user preference setting and information from the TRT. At block 535, a delay timer may be set to wait for the cooling operations to take effect on the over-temperature component. At block 540, the policy manager may poll or query the over-temperature component to determine its thermal condition. If the thermal condition of the over-temperature component is still not acceptable (e.g., current temperature over the trip point), the process continues at block 510. Otherwise, the cooling operations performed may be considered sufficient.

Figure 6:
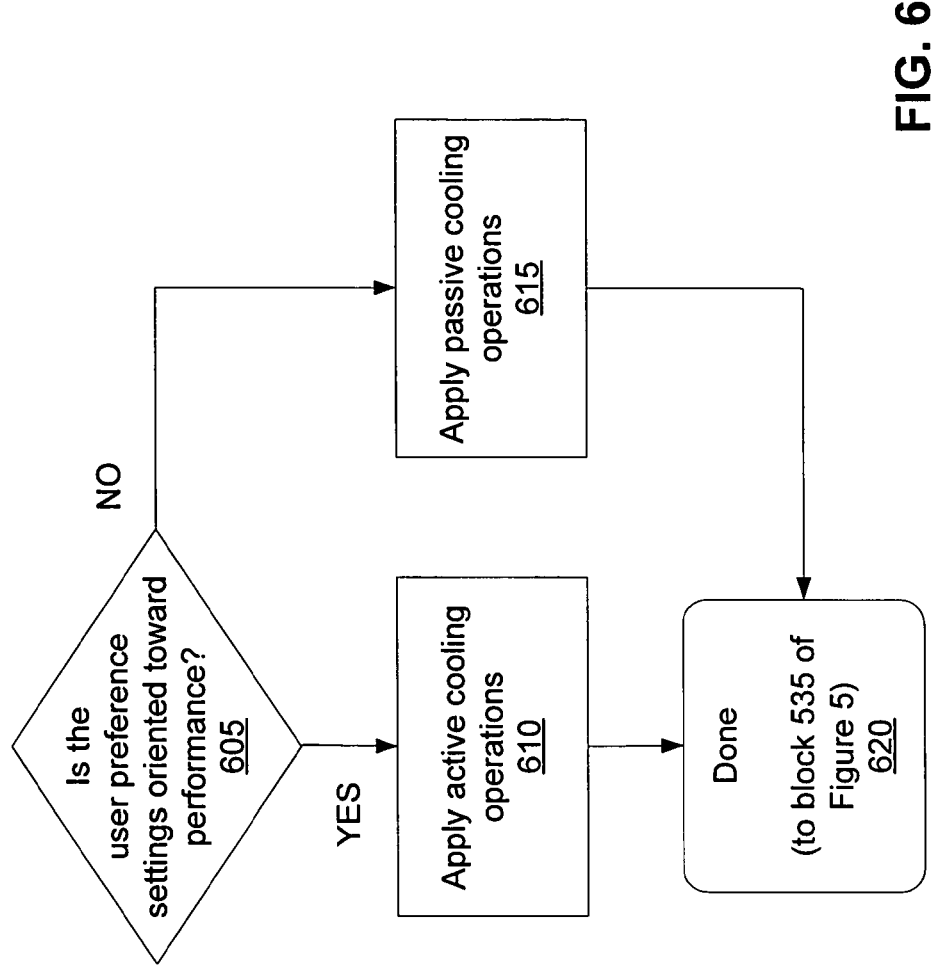
FIG. 6 is a flow diagram illustrating an example of process used to determine cooling operations, in accordance with one embodiment.

FIG. 6 is a flow diagram illustrating an example of process used to determine cooling operations, in accordance with one embodiment. At block 605, a test is performed to determine whether the user preference setting is directed toward performance or toward low thermal dissipation or longer battery life. If it's directed toward performance, the process continues at block 610, where active cooling operations may be performed. The active cooling operations may include activating one or more of a component dedicated active cooling device, a thermal zone active cooling device, and a platform active cooling device. The process then continues at block 620.

From block 605, if the user preference setting is directed toward low thermal dissipation (i.e., long battery life), the process continues at block 615 where passive cooling operations may be performed. The passive cooling operations may include transitioning a component to a different P state and/or T state. The component may be the over-temperature component, or a component that has a high thermal influence on the over-temperature component, or both. The process then continues at block 620. As mentioned above, the policy manager may keep track of the components that have been controlled so that these components can be returned to their higher performance states when the adverse condition is remedied.

Computer System

Figure 7:
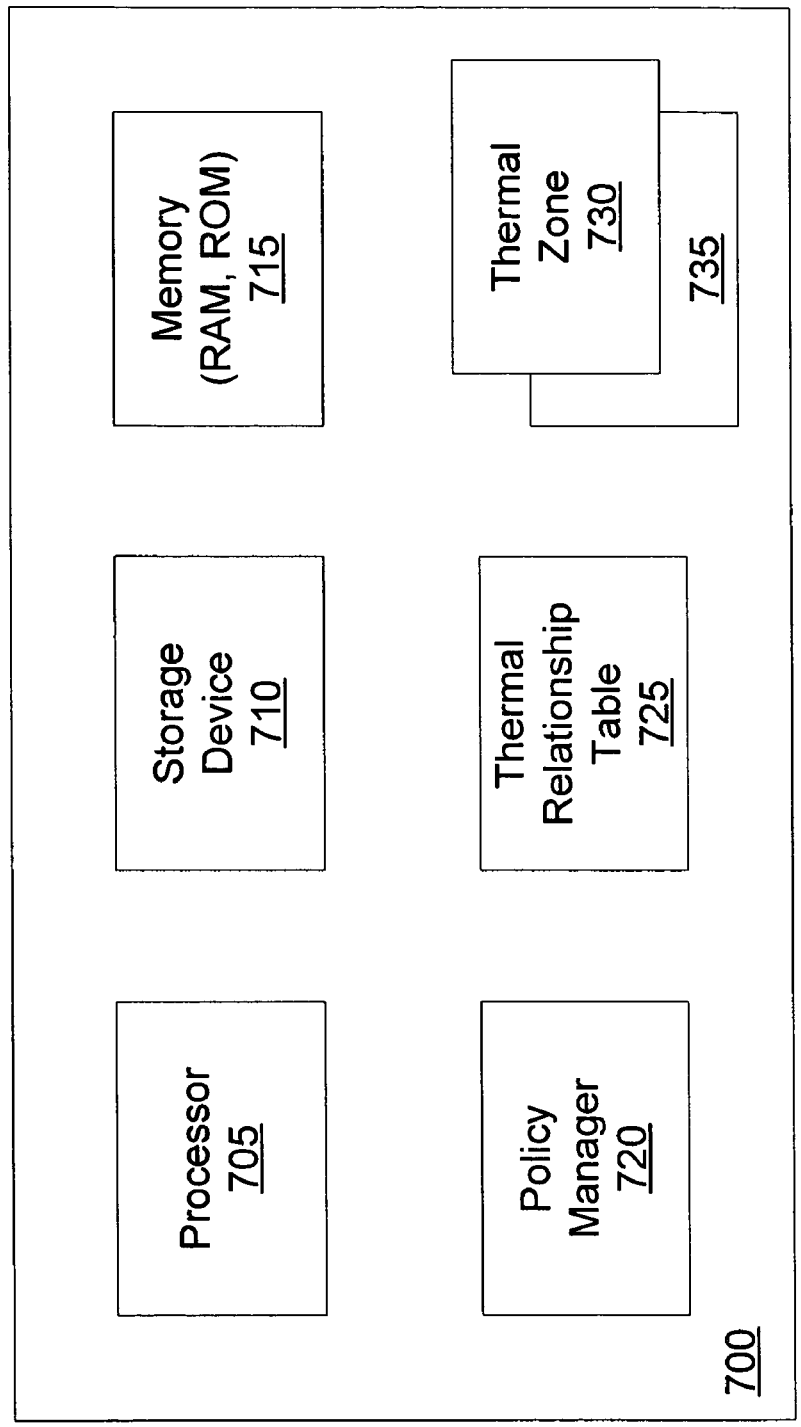
FIG. 7 illustrates one example of a computer system, in accordance with one embodiment.

FIG. 7 illustrates one example of a computer system, in accordance with one embodiment. Computer system 700 may include processor 705. The processor 705 may be a processor in the family of Pentium processors manufactured by Intel Corporation of Santa Clara, Calif. Other processors may also be used. The computer system 700 may include storage device 710 and memory 715. The memory 715 may be a combination of one or more static random access memory (SRAM), dynamic random access memory (DRAM), read only memory (ROM), etc.

The computer system 700 may also include a policy manager 720, a thermal relationship table (TRT) 725 and two or more thermal zones 730-735. Although not shown, the thermal zone 730 may include two or more thermally controllable components. Although not shown, the computer system 700 may also include other components to enable it to perform various functions.

Computer Readable Media

It is also to be understood that because embodiments of the present invention may be implemented as one or more software programs, embodiments of the present invention may be implemented or realized upon or within a machine readable medium. For example, the policy manager may be implemented in software and the instructions associated with the policy manager may be stored in a machine readable medium. A machine readable medium may include any mechanism for storing or transmitting information in a form readable by a machine (e.g., a computer). For example, a machine readable medium may include read only memory (ROM); random access memory (RAM); magnetic disk storage media; optical storage media; flash memory devices, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A device, comprising:
    logic to:
        determine a thermal influence each of a second and third component have on a first component, the first, second, and third components comprising a computing system;
        determine a performance impact to the computer system of each of the second and third components; and
        manage a thermal condition of the first component based on the determination of the thermal influence and the determination of the performance impact by adjusting a thermal condition of one of the second and third components to reduce a temperature of the one of the second and third components.

2. The device of claim 1, wherein the logic to:
    receive thermal information associated with the second and third components.

3. The device of claim 2, wherein the thermal information associated with the second and third components include one or more trip point values, current temperature, and current thermal load (CTL).

4. The device of claim 2, wherein the logic to:
    determine user preference settings as related to the first component.

5. The device of claim 4, wherein the user preference settings relate to performance, energy conservation, or user experience.

6. The device of claim 5, wherein the logic to:
enable active cooling operations when the user preference settings relate to performance and enable passive cooling operations when the user preference settings relate to energy conservation.

7. The device of claim 5, wherein the logic to:
allocate additional resources when the user preference settings relate to user experience.

8. The device of claim 1, wherein at least one of the first component, the second component, and the third component is a processor.

9. A non-transitory computer-readable medium to store instructions, which when executed by a computer, causes the computer to perform a method, comprising:
determining a thermal influence each of a second and third component have on a first component, the first, second, and third components comprising a computing system;
determining a performance impact to the computer system of each of the second and third components; and
managing a thermal condition of the first component based on the determination of the thermal influence and the determination of the performance impact by adjusting a thermal condition of one of the second and third components to reduce a temperature of the one of the second and third components.

10. The non-transitory computer-readable medium of claim 9, wherein the method further comprises:
receiving thermal information associated with the second and third components.

11. The non-transitory computer-readable medium of claim 10, wherein the thermal information associated with the second and third components include one or more trip point values, current temperature, and current thermal load (CTL).

12. The non-transitory computer-readable medium of claim 10, wherein the method further comprises:
determining user preference settings as related to the first component.

13. The non-transitory computer-readable medium of claim 12, wherein the user preference settings relate to performance, energy conservation, or user experience.

14. The non-transitory computer-readable medium of claim 13, wherein the method further comprises:
enabling active cooling operations when the user preference settings relate to performance and enabling passive cooling operations when the user preference settings relate to energy conservation.

15. The non-transitory computer-readable medium of claim 13, wherein the method further comprises:
allocating additional resources when the user preference settings relate to user experience.

16. The non-transitory computer-readable medium of claim 9, wherein at least one of the first component, the second component, and the third component is a processor.

17. A method, comprising:
determining a thermal influence each of a second and third component have on a first component, the first, second, and third components comprising a computing system;
determining a performance impact to the computer system of each of the second and third components; and
managing a thermal condition of the first component based on the determination of the thermal influence and the determination of the performance impact by adjusting a thermal condition of one of the second and third components to reduce a temperature of the one of the second and third components.

18. The method of claim 17, further comprising:
receiving thermal information associated with the second and third components.

19. The method of claim 18, wherein the thermal information associated with the second and third components include one or more trip point values, current temperature, and current thermal load (CTL).

20. The method of claim 18, further comprising:
determining user preference settings as related to the first component.

21. The method of claim 20, wherein the user preference settings relate to performance, energy conservation, or user experience.

22. The method of claim 21, further comprising:
enabling active cooling operations when the user preference settings relate to performance and enabling passive cooling operations when the user preference settings relate to energy conservation.

23. The method of claim 21, further comprising:
allocating additional resources when the user preference settings relate to user experience.

24. The method of claim 17, wherein at least one of the first component, the second component, and the third component is a processor.

* * * * *